(12) United States Patent
Chuang

(10) Patent No.: US 6,771,255 B2
(45) Date of Patent: Aug. 3, 2004

(54) TOUCH PEN WITH ILLUMINATING UNIT FOR COMPUTERIZED APPARATUS

(75) Inventor: Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 275 days.

(21) Appl. No.: 09/989,656

(22) Filed: Nov. 21, 2001

(65) Prior Publication Data

US 2003/0095114 A1 May 22, 2003

(51) Int. Cl.⁷ ................................................. G09G 5/00
(52) U.S. Cl. ....................................... 345/179; 345/173
(58) Field of Search ................................. 345/179, 180, 345/181, 182, 183, 173; 361/686; 362/118

(56) References Cited

U.S. PATENT DOCUMENTS

| | | | | |
|---|---|---|---|---|
| 5,475,401 A | * | 12/1995 | Verrier et al. ................ | 345/179 |
| 5,638,093 A | * | 6/1997 | Takahashi et al. ........... | 345/173 |
| 6,208,330 B1 | * | 3/2001 | Hasegawa et al. ........... | 345/173 |
| 6,238,057 B1 | * | 5/2001 | Chen ............................ | 361/118 |
| 6,575,589 B2 | * | 6/2003 | Hisasue et al. .............. | 362/118 |
| 6,577,299 B1 | * | 6/2003 | Schiller et al. .............. | 345/179 |
| 6,621,697 B2 | * | 9/2003 | O'Hara et al. ............... | 361/686 |

\* cited by examiner

Primary Examiner—Vijay Shankar
Assistant Examiner—Prabodh M. Dharia
(74) Attorney, Agent, or Firm—Foley & Lardner LLP

(57) ABSTRACT

A touch pen includes a pen barrel having opposite first and second barrel portions. An illuminating unit is received in the first barrel portion, and includes a switch connected to a light source and a power source and operable so as to establish electrical connection between the light source and the power source for enabling the light source to generate a light output which radiates out of the pen barrel via an open end of the first barrel portion. A transparent pen cap has a mounting end portion sleeved removably on the first barrel portion, and a touch tip opposite to the mounting end portion and adapted for touching a touch control panel of a computerized apparatus.

6 Claims, 4 Drawing Sheets

TOUCH PEN WITH ILLUMINATING UNIT FOR COMPUTERIZED APPARATUS

BACKGROUND OF THE INVENTION

1. Field of the Invention

The invention relates to a touch pen for a computerized apparatus, more particularly to a touch pen with an illuminating unit.

2. Description of the Related Art

Portable computerized apparatuses, such as personal digital assistants, have grown in popularity in recent years. In an example of a known personal digital assistant, a transparent touch control panel, which serves as a user input unit, can be pressed at a specific location by a touch pen so as to generate a control signal corresponding to the specific location. A back lighting unit, which serves as an illumination unit, is used to provide illumination for the personal digital assistant when the latter is used in a dim environment. Usually, a rechargeable battery set supplies power to the personal digital assistant. The fully-charged battery set has a service life of about 15~16 hours in normal use without activating the back lighting unit. However, the fully-charged battery has a shorter service life of about 2 hours when the back lighting unit is constantly activated. Accordingly, power consumption of the personal digital assistant is increased when the back lighting unit is activated such that the battery set has a shorter service life, thereby resulting in inconvenience during use.

SUMMARY OF THE INVENTION

Therefore, the object of the present invention is to provide a touch pen with an illuminating unit that can be used to operate a computerized apparatus in a dim environment without activating a back lighting unit of the computerized apparatus.

According to the present invention, a touch pen is adapted for use with a computerized apparatus having a touch control panel, and comprises:

a pen barrel having first and second barrel portions opposite to each other along an axis of the pen barrel, the first barrel portion being formed with an open end;

an illuminating unit received in the first barrel portion, and including a light source, a power source, and a switch connected to the light source and the power source and operable so as to establish electrical connection between the light source and the power source for enabling the light source to generate a light output which radiates out of the pen barrel via the open end of the first barrel portion; and a transparent pen cap having a mounting end portion sleeved removably on the first barrel portion, and a touch tip opposite to the mounting end portion and adapted for touching the touch control panel of the computerized apparatus.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
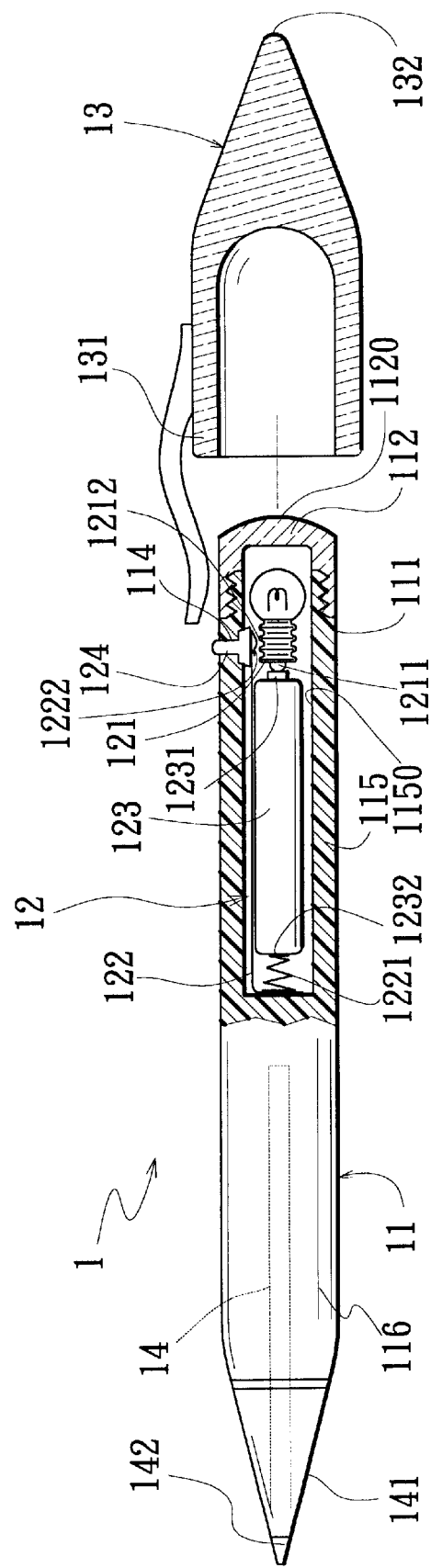
FIG. 1 is a partly exploded, schematic sectional view showing the preferred embodiment of a touch pen according to this invention.
Figure 3:
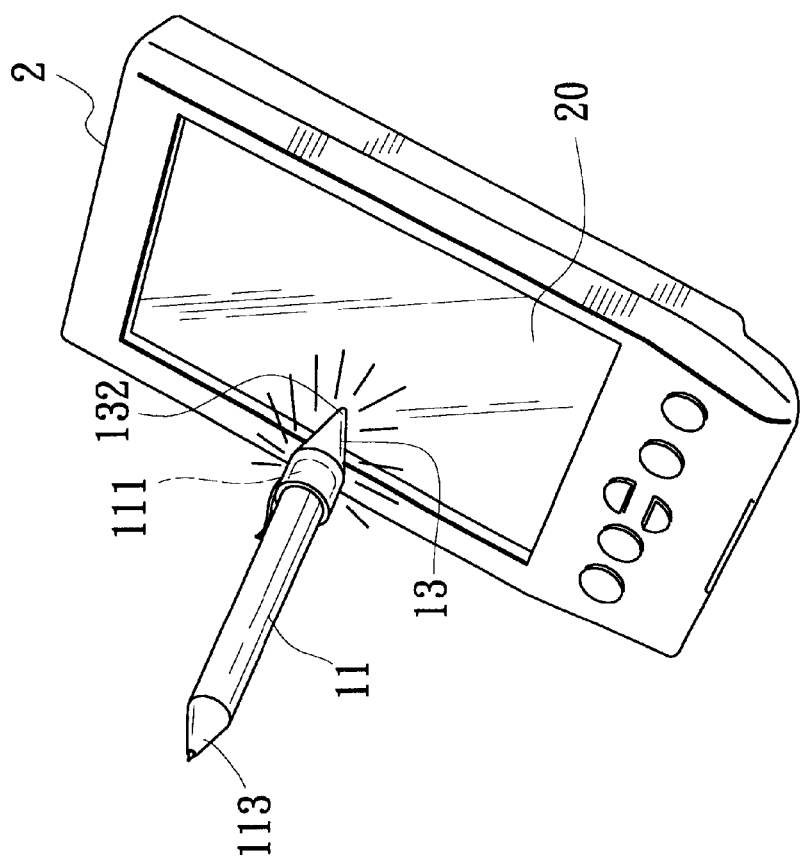
FIG. 3 is a perspective view showing the preferred embodiment when used in conjunction with a computerized apparatus.

Referring to FIGS. 1 and 3, according to the preferred embodiment of the present invention, a touch pen 1 for a computerized apparatus, such as a personal digital assistant 2 with a touch control panel 20, is shown to include a pen barrel 11, an illuminating unit 12, and a transparent pen cap 13.

The pen barrel 11 has first and second barrel portions 115, 116 opposite to each other along an axis of the pen barrel 11. The first barrel portion 115 is formed with an open end 111. The touch pen 1 further includes a transparent barrel cap 112 that is made of a transparent material, such as acrylic, and that is formed with a convex lens surface 1120. In this embodiment, the barrel cap 112 is mounted threadedly and removably on the first barrel portion 115 to close the open end 111.

Figure 2:
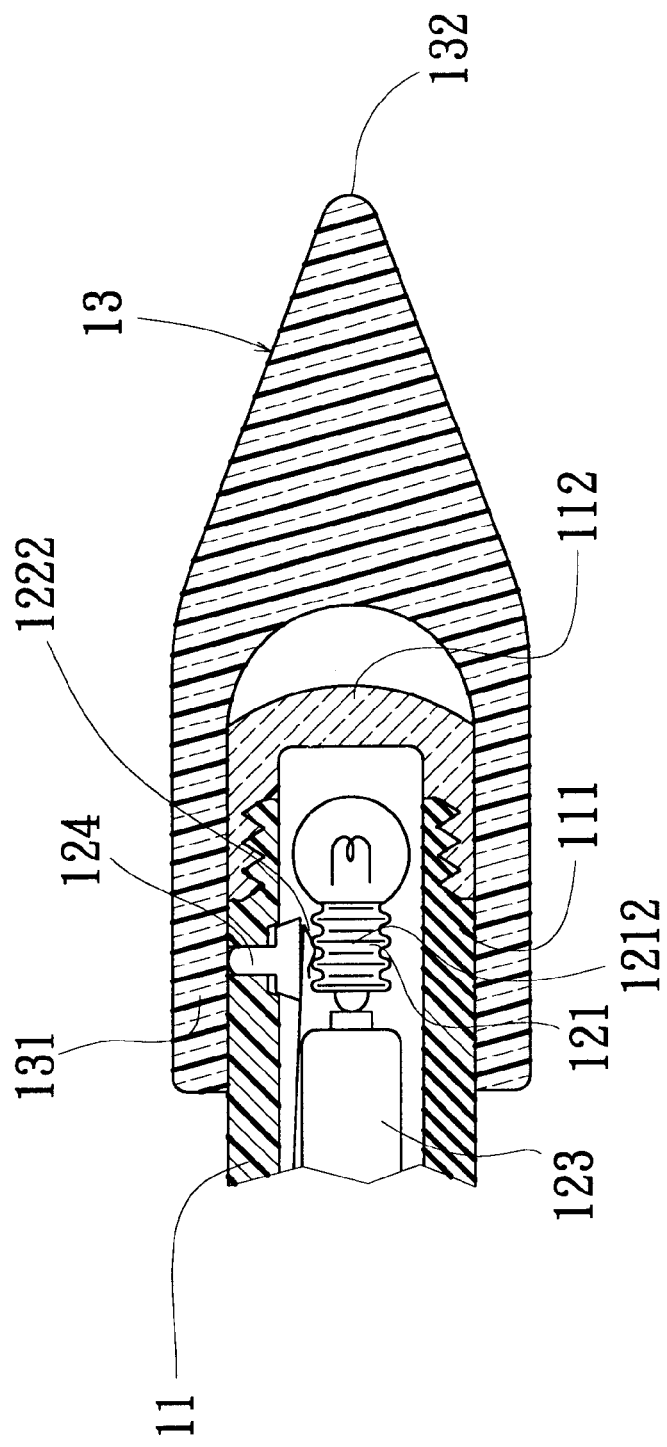
FIG. 2 is a fragmentary schematic sectional view showing an illuminating unit of the preferred embodiment in an activated state.

The illuminating unit 12 is received in the first barrel portion 115, and includes a light source, a power source, and a switch connected to the light source and the power source and operable so as to establish electrical connection between the light source and the power source for enabling the light source to generate a light output which radiates out of the pen barrel 11 via the transparent barrel cap 112 mounted on the first barrel portion 115. In this embodiment, the light source is a lamp 121 that has a first lamp terminal 1211, and a second lamp terminal 1212 surrounded by an inner wall surface 1150 of the first barrel portion 115. The power source is a battery cell 123 that has a first battery terminal 1231, and a second battery terminal 1232 opposite to the first battery terminal 1231 along the axis of the pen barrel 11. The first battery terminal 1231 is connected electrically to the first lamp terminal 1211. The switch includes a resilient conductive contact member 122 having a first contact end 1221, in the form of a coiled spring, connected electrically to the second battery terminal 1232, and a second contact end 1222 disposed to extend between the inner wall surface 1150 of the first barrel portion 115 and the second lamp terminal 1212 and normally spaced apart from the second lamp terminal 1212. The switch further includes an operating button 124 mounted movably on the first barrel portion 115 and disposed to extend into the first barrel portion 115 adjacent to the second contact end 1222 via a through hole 114 formed in the first barrel portion 115. The operating button 124 is movable to an ON position for urging the second contact end 1222 to contact the second lamp terminal 1212 so as to establish a closed electrical circuit between the lamp 121 and the battery cell 123 (see FIG. 2).

The pen cap 13, which is made of a transparent material, such as acrylic, has a mounting end portion 131 sleeved removably on the first barrel portion 115, and a touch tip 132 opposite to the mounting end portion 131 and adapted for touching the touch control panel 20 of the personal digital assistant 2 (see FIG. 3). When the pen cap 13 is sleeved on the first barrel portion 115, the operating button 124 is moved radially and inwardly to the ON position relative to the first barrel portion 115 by the pen cap 13.

Figure 4:
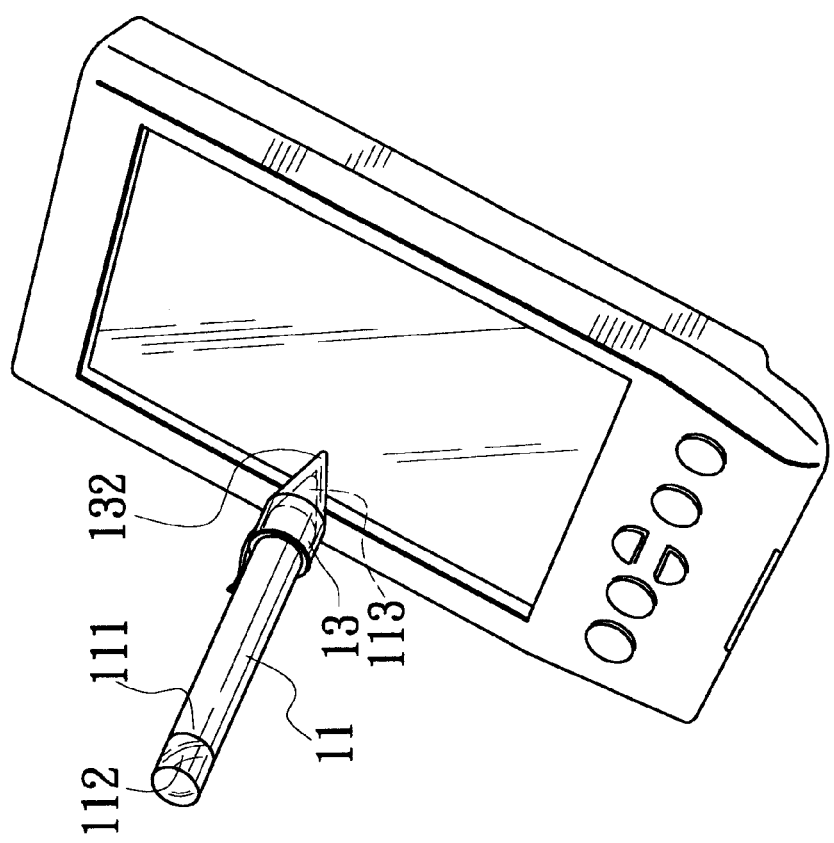
FIG. 4 is a perspective view showing the preferred embodiment in another state where the illuminating unit is deactivated.

Moreover, in order to enhance utility of the touch pen 1, the touch pen 1 further has a writing instrument 14 that includes a writing cap 141 mounted on the second barrel portion 116, and a writing tip 142 confined within the writing cap 141. As shown in FIG. 4, the mounting end portion 131 of the pen cap 13 can be sleeved removably on the second barrel portion 116 so as to conceal the writing instrument 14.

It is noted that the touch pen 1 of the present invention can provide a light output for illumination when operating the personal digital assistant in a dim environment. Therefore, there is no need for activating a back lighting unit (not shown) of the personal digital assistant 2, thereby resulting in lower power consumption during use. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A touch pen for a computerized apparatus with a touch control panel, said touch pen comprising:

a pen barrel having first and second barrel portions opposite to each other along an axis of said pen barrel, said first barrel portion being formed with an open end;

an illuminating unit received in said first barrel portion, and including a light source, a power source, and a switch connected to said light source and said power source and operable so as to establish electrical connection between said light source and said power source for enabling said light source to generate a light output which radiates out of said pen barrel via said open end of said first barrel portion; and a transparent pen cap having a mounting end portion sleeved removably on said first barrel portion, and a touch tip opposite to said mounting end portion and adapted for touching the touch control panel of the computerized apparatus.

2. The touch pen as claimed in claim 1, wherein:

said light source is a lamp having a first lamp terminal and a second lamp terminal surrounded by an inner wall surface of said first barrel portion;

said power source being a battery cell having a first battery terminal and a second battery terminal opposite to said first battery terminal along the axis of said pen barrel, said first battery terminal being connected electrically to said first lamp terminal;

said switch including a resilient conductive contact member having a first contact end connected electrically to said second battery terminal, and a second contact end disposed to extend between said inner wall surface of said first barrel portion and said second lamp terminal and normally spaced apart from said second lamp terminal;

said switch further including an operating button mounted movably on said first barrel portion and disposed to extend into said first barrel portion adjacent to said second contact end, said operating button being movable to an ON position for urging said second contact end to contact said second lamp terminal so as to establish a closed electrical circuit between said lamp and said battery cell.

3. The touch pen as claimed in claim 2, wherein said operating button is moved radially and inwardly to the ON position relative to said first barrel portion by said pen cap when said pen cap is sleeved on said first barrel portion.

4. The touch pen as claimed in claim 2, further comprising a transparent barrel cap formed with a convex lens surface and mounted removably on said first barrel portion to close said open end.

5. The touch pen as claimed in claim 1, further comprising a transparent barrel cap formed with a convex lens surface and mounted on said first barrel portion to close said open end.

6. The touch pen as claimed in claim 1, further comprising a writing instrument that includes a writing cap mounted on said second barrel portion, and a writing tip confined within said writing cap, said mounting end portion of said pen cap being capable of being sleeved removably on said second barrel portion so as to conceal said writing instrument.

\* \* \* \* \*